(12) United States Patent
Blei et al.

(10) Patent No.: US 8,188,193 B2
(45) Date of Patent: May 29, 2012

(54) METHOD FOR POST-CROSSLINKING OF THE SURFACE OF WATER-ABSORBING POLYMER PARTICLES

(75) Inventors: Stefan Blei, Mannheim (DE); Marco Krüger, Mannheim (DE); Wilfried Heide, Freinsheim (DE); Matthias Weismantel, Jossgrund-Oberndorf (DE); Uwe Stueven, Bad Soden (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/002,559

(22) PCT Filed: Jul. 3, 2009

(86) PCT No.: PCT/EP2009/058414
§ 371 (c)(1),
(2), (4) Date: Jan. 4, 2011

(87) PCT Pub. No.: WO2010/003897
PCT Pub. Date: Jan. 14, 2010

(65) Prior Publication Data
US 2011/0112252 A1    May 12, 2011

(30) Foreign Application Priority Data
Jul. 9, 2008  (EP) .................................... 08160007

(51) Int. Cl.
*C08F 8/14*  (2006.01)

(52) U.S. Cl. ............... 525/329.7; 525/330.2; 525/330.3; 525/330.6; 525/383; 525/384; 427/212; 427/213

(58) Field of Classification Search ............... 525/329.7, 525/330.2, 330.3, 330.6, 383, 384; 427/212, 427/213
See application file for complete search history.

(56) References Cited

U.S. PATENT DOCUMENTS
2006/0128902 A1 * 6/2006 Flohr et al. ................. 525/329.7

FOREIGN PATENT DOCUMENTS
WO    WO-2004/018006 A1    3/2004
WO    WO 2006/082240    *    8/2006

OTHER PUBLICATIONS

Buchholz et al. (eds.), Modern Superabsorbent Polymer Technology, Wiley-VCH, pp. 71-103 (1998).
International Search Report for corresponding International application No. PCT/EP2009/058414, dated Aug. 18, 2009.

* cited by examiner

*Primary Examiner* — Vasu Jagannathan
*Assistant Examiner* — Robert C Boyle
(74) *Attorney, Agent, or Firm* — Marshall, Gerstein & Borun LLP

(57) ABSTRACT

A process for thermally surface postcrosslinking water-absorbing polymer particles in a fluidized bed generated by means of a carrier gas, wherein the surface postcrosslinker is supplied to the fluidized bed in gaseous form.

8 Claims, No Drawings

METHOD FOR POST-CROSSLINKING OF THE SURFACE OF WATER-ABSORBING POLYMER PARTICLES

CROSS-REFERENCE TO RELATED APPLICATIONS

This is the U.S. national phase application of International Application No. PCT/EP2009/058414, Filed Jul. 3, 2009, which claims the benefit of European patent application No. 08160007.4, filed Jul. 9, 2008.

The present invention relates to a process for thermally surface postcrosslinking water-absorbing polymer particles in a fluidized bed generated by means of a carrier gas, wherein the surface postcrosslinker is supplied to the fluidized bed in gaseous form.

The preparation of water-absorbing polymer particles is described in the monograph "Modern Superabsorbent Polymer Technology", F. L. Buchholz and A. T. Graham, Wiley-VCH, 1998, pages 71 to 103.

Water-absorbing polymers are used to produce diapers, tampons, sanitary napkins and other hygiene articles, but also as water-retaining agents in market gardening. The water-absorbing polymers are also referred to as superabsorbents.

The properties of the water-absorbing polymers can be adjusted via the degree of crosslinking. With increasing degree of crosslinking, the gel strength rises and the centrifuge retention capacity (CRC) falls.

To improve the performance properties, for example permeability of the swollen gel bed (SFC) in the diaper and absorption under a pressure of 49.2 g/cm$^2$ (AUL0.7 psi), water-absorbing polymer particles are generally surface postcrosslinked. This increases the degree of crosslinking of the particle surface, which allows the absorption under a pressure of 49.2 g/cm$^2$ (AUL0.7 psi) and the centrifuge retention capacity (CRC) to be at least partially decoupled. This surface postcrosslinking can be carried out in aqueous gel phase. However, dried, ground and screened polymer particles (base polymer) are preferably surface coated with a surface postcrosslinker, thermally surface postcrosslinked and dried. Crosslinkers suitable for this purpose are compounds which comprise at least two groups which can form covalent bonds with the carboxylate groups of the water-absorbing polymers.

WO 00/053664 A1 describes, for example in examples 15 to 17, surface postcrosslinking wherein water-absorbing polymer particles are coated with an aqueous surface postcrosslinker solution in a paddle drier, the coated polymer particles are thermally surface postcrosslinked in a disk drier and the surface postcrosslinked polymer particles are cooled in a fluidized bed by means of air.

It was an object of the present invention to provide an improved process for surface postcrosslinking water-absorbing polymer particles.

The object is achieved by a process for thermally surface postcrosslinking water-absorbing polymer particles in a fluidized bed generated by means of a carrier gas, which comprises supplying at least one surface postcrosslinker to the fluidized bed in gaseous form.

The water-absorbing polymer particles are produced, for example, by polymerizing a monomer solution comprising
a) at least one ethylenically unsaturated monomer which bears acid groups and may be at least partially neutralized,
b) at least one crosslinker,
c) at least one initiator,
d) optionally one or more ethylenically unsaturated monomers copolymerizable with the monomers mentioned under a) and
e) optionally one or more water-soluble polymers.
and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

Further suitable monomers a) are, for example, ethylenically unsaturated sulfonic acids, such as styrenesulfonic acid and 2-acrylamido-2-methylpropanesulfonic acid (AMPS).

The acid groups of the monomers a) have typically been partially neutralized. To this end, the neutralizing agent is mixed into the monomer solution as an aqueous solution or preferably also as a solid. The degree of neutralization is preferably from 25 to 95 mol %, more preferably from 30 to 80 mol %, most preferably from 40 to 75 mol %, for which the customary neutralizing agents can be used, preferably alkali metal hydroxides, alkali metal oxides, alkali metal carbonates or alkali metal hydrogen-carbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example. ethylene glycol dimethacrylate, diethylene glycol diacrylate, polyethylene glycol diacrylate. allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1. EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example. in DE 195 43 368 A1, DE 196 46 484 A1, WO 90/15830 A1 and WO 2002/032962 A2.

Preferred crosslinkers b) are pentaerythrityl triallyl ether, tetraalloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably from 0.05 to 1.5% by weight, more preferably from 0.1 to 1% by weight, most preferably from 0.3 to 0.6% by weight, based in each case on monomer a). With rising crosslinker content, the centrifuge retention capacity (CRC) falls and the absorption under a pressure of 21.0 g/cm$^2$ (AUL0.3 psi) passes through a maximum.

The initiators c) may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate and diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight, most preferably from 50 to 65% by weight.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors (gel polymerization). In the kneader, the polymer gel formed in the polymerization of an aqueous monomer solution is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms a polymer gel, which has to be comminuted in a further process step, for example in an extruder or kneader.

When kneading reactors or belt reactors are used, it is possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel obtained is preferably dried with a belt drier until the residual moisture content is preferably from 0.5 to 15% by weight, more preferably from 1 to 10% by weight, most preferably from 2 to 8% by weight, the residual moisture content being determined by the EDANA (European Disposables and Nonwovens Association) recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight, most preferably from 40 to 60% by weight. Optionally, it is, however, also possible to use a fluidized bed drier or a paddle drier for the drying operation.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 μm, more preferably from 250 to 600 μm, very particularly from 300 to 500

μm. The mean particle size of the product fraction may be determined by means of the EDANA (European Disposables and Nonwovens Association) recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 μm is preferably at least 90% by weight, more preferably at least 95% by weight, most preferably at least 98% by weight.

Polymer particles with too small a particle size lower the permeability (SFC). The proportion of excessively small polymer particles ("fines") should therefore be small.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated, for example, by adjusting the amount of crosslinker b) used.

When the excessively small polymer particles are added at a very late stage, for example not until in an apparatus connected downstream of the polymerization reactor, for example to an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 μm is preferably at least 90% by weight, more preferably at least 95% by weight, most preferably at least 98% by weight.

Polymer particles with too great a particle size lower the swell rate. The proportion of excessively large polymer particles should therefore likewise be small.

Excessively large polymer particles are therefore typically removed and recycled into the grinding of the dried polymer gel.

However, it is also possible to dropletize an aqueous monomer solution and to polymerize the droplets generated in a heated carrier gas stream (dropletization polymerization). This allows the process steps of polymerization and drying to be combined, and the process steps of comminution and classification to be dispensed with, as described in WO 2008/040715 A2 and WO 2008/052971 A1. To this end, the monomer solution is metered into the reaction chamber by means of at least one bore to form droplets. The bores may be present, for example, in a dropletizer plate.

A dropletizer plate is a plate with at least one bore, the liquid passing through the bore from the top. The dropletizer plate or the liquid can be made to vibrate, which generates a chain of ideally monodisperse droplets at each bore on the underside of the dropletizer plate. In a preferred embodiment, the dropletizer plate is not excited.

The number and the size of the bores are selected according to the desired capacity and droplet size. The droplet diameter is typically 1.9 times the diameter of the bore. What is important here is that the liquid to be dropletized does not pass too rapidly through the bore and the pressure drop over the bore is not too great. Otherwise, the liquid is not dropletized, but rather the liquid jet is broken up (sprayed) owing to the high kinetic energy. The Reynolds number based on the throughput per bore and the bore diameter is preferably less than 2000, preferentially less than 1000, more preferably less than 500, most preferably less than 250.

The dropletizer plate has typically at least one bore, preferably at least 10 and more preferably at least 50 bores, and typically up to 10 000, preferably up to 5000 and more preferably up to 1000 bores, the bores typically being distributed homogeneously over the dropletizer plate, preferably in so-called triangular pitch, i.e. three bores in each case form the corners of an equilateral triangle.

The distance between the bores is preferably from 1 to 50 mm, more preferably from 2.5 to 20 mm, most preferably from 5 to 10 mm.

A carrier gas flows through the polymerization reactor. This carrier gas can be conducted through the reaction chamber in cocurrent or in countercurrent to the free-falling droplets of the monomer solution, preferably in cocurrent, i.e. from the bottom upward. After one pass, the carrier gas is preferably recycled into the reaction chamber as cycle gas at least partly, preferably to an extent of at least 50% by weight, more preferably to an extent of at least 75% by weight. Typically, a portion of the carrier gas is discharged after each pass, preferably up to 10%, more preferably up to 3%, most preferably up to 1%.

The oxygen content of the carrier gas is preferably from 0.5 to 15% by volume, more preferably from 1 to 10% by volume, most preferably from 2 to 5% by volume.

As well as oxygen, the carrier gas preferably comprises nitrogen. The nitrogen content of the carrier gas is preferably at least 80% by volume, more preferably at least 90% by volume, most preferably at least 93% by volume.

The gas velocity is preferably established such that the flow in the polymerization reactor is directed, for example no convection currents opposed to the general flow direction are present, and is, for example, from 0.01 to 5 m/s, preferably from 0.02 to 4 m/s, more preferably from 0.05 to 3 m/s, most preferably from 0.1 to 2 m/s.

The carrier gas flowing through the reactor is appropriately preheated to the reaction temperature upstream of the reactor.

The gas inlet temperature, i.e. the temperature with which the carrier gas enters the reaction chamber, is preferably from 160 to 250° C., more preferably from 180 to 230° C., most preferably from 190 to 220° C.

Advantageously, the gas inlet temperature is regulated such that the gas outlet temperature, i.e. the temperature with which the carrier gas leaves the reaction chamber, is from 100 to 180° C., more preferably from 110 to 160° C., most preferably from 120 to 140° C.

The reaction can be carried out under elevated pressure or under reduced pressure; a reduced pressure of up to 100 mbar relative to ambient pressure is preferred.

The reaction offgas, i.e. the gas leaving the reaction chamber, can, for example, be cooled in a heat exchanger. This condenses water and unconverted monomer a). Thereafter, the reaction offgas can at least partly be heated again and be recycled into the reactor as cycle gas. A portion of the reaction offgas can be discharged and replaced by fresh carrier gas, in which case water and unconverted monomers a) present in the reaction offgas can be removed and recycled.

Particular preference is given to an integrated system, i.e. a portion of the waste heat in the cooling of the offgas is used to heat the cycle gas.

The reactors can be trace-heated. This trace heating is adjusted such that the wall temperature is at least 5° C. above the internal reactor temperature and condensation at the reactor walls can be reliably prevented.

The water-absorbing polymer particles which are obtained, for example, by gel polymerization or dropletization polymerization are subsequently surface postcrosslinked by the process according to the invention.

To this end, the water-absorbing polymer particles are fluidized in a fluidized bed reactor by means of a carrier gas.

The oxygen content of the carrier gas is preferably less than 5% by volume. As a result of the low oxygen content, ignitable mixtures in the reactor are avoided.

The carrier gas preferably comprises nitrogen. The nitrogen content of the carrier gas is preferably at least 80% by volume, more preferably at least 90% by volume, most preferably at least 95% by volume.

It is important that the surface postcrosslinker is metered into the reactor in gaseous form. To this end, an appropriate amount can be evaporated and introduced into the reactor in gaseous form. However, it is also possible to load the carrier gas with an appropriate amount of surface postcrosslinker upstream of the reactor. For this purpose, for example, temperature-controlled gas scrubbers filled with the surface postcrosslinker are suitable.

The gaseous metered addition enables gentle and very homogeneous surface postcrosslinking. The otherwise customary use of aqueous solutions with the associated tendency to form lumps is dispensed with.

The surface postcrosslinkers which can be used are not subject to any restrictions. Suitable surface postcrosslinkers are compounds which comprise groups which can form covalent bonds with at least two carboxylate groups of the polymer particles.

Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP O450 922 A2, or β-hydroxyalkylamides, as described in DE 102 04 938 A1 and U.S. Pat. No. 6,239,230.

Preferred surface postcrosslinkers are difunctional alcohols (diols), such as ethylene glycol, propylene glycol, 1,3-propanediol, 1,2-butanediol, 1,3-butanediol, 2,3-butanediol and 1,4-butanediol.

Very particularly preferred surface postcrosslinkers are propylene glycol and 2,3-butanediol.

However, the surface postcrosslinkers should have a vapor pressure which is sufficiently high at reaction temperature. In the case of too low a vapor pressure, the surface postcrosslinker can be metered in only slowly and the process becomes uneconomic owing to the necessary long residence times. This is because the partial pressure of the surface postcrosslinker in the carrier gas can never be higher that the vapor pressure. At excessively high partial pressures of the surface postcrosslinker, the water-absorbing polymer particles tend to form lumps even in the absence of a solvent.

The partial pressure of the surface postcrosslinker in the carrier gas of the fluidized bed is preferably from 5 to 200 mbar, more preferably from 10 to 100 mbar, most preferably from 15 to 50 mbar.

The reaction temperatures are in the range of preferably from 150 to 250° C., more preferably from 155 to 220° C., most preferably from 160 to 200° C. The preferred residence time of the water-absorbing polymer particles in the fluidized bed is preferably at least 10 minutes, more preferably at least 20 minutes and most preferably at least 30 minutes, and typically at most 120 minutes.

The reaction offgas of the surface postcrosslinking, i.e. the carrier gas leaving the fluidized bed, can at least partly be recycled into the surface postcrosslinking as cycle gas. A portion of the reaction offgas can be discharged and replaced by fresh carrier gas, in which case surface postcrosslinker present in the reaction offgas can be removed and recycled.

To further improve the properties, the surface postcrosslinked polymer particles can be coated or subsequently moistened. Suitable coatings for improving the swell rate and the permeability (SFC) are, for example, inorganic inert substances, such as water-insoluble metal salts, organic polymers, cationic polymers and di- or polyvalent metal cations, for example, aluminum cations as aqueous aluminum lactate or aluminum sulfate solution. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a centrifuge retention capacity (CRC) of typically at least 15 g/g, preferably at least 20 g/g, preferentially at least 22 g/g, more preferably at least 24 g/g, most preferably at least 26 g/g. The centrifuge retention capacity (CRC) of the water-absorbing polymer particles is typically less than 60 g/g. The centrifuge retention capacity (CRC) is determined by the EDANA (European Disposables and Nonwovens Association) recommended test method No. WSP 241.2-05 "Centrifuge Retention Capacity".

The water-absorbing polymer particles produced by the process according to the invention have an absorption under a pressure of 49.2 g/cm$^2$ (AUL0.7 psi) of typically at least 15 g/g, preferably at least 20 g/g, preferentially at least 22 g/g, more preferably at least 24 g/g, most preferably at least 26 g/g. The absorption under a pressure of 49.2 g/cm$^2$ (AUL0.7 psi) of the water-absorbing polymer particles is typically less than 35 g/g. The absorption under a pressure of 49.2 g/cm$^2$ (AUL0.7 psi) is determined analogously to the EDANA (European Disposables and Nonwovens Association) recommended test method No. WSP 242.2-05 "Absorption Under Pressure", except that a pressure of 49.2 g/cm$^2$ (AUL0.7 psi) is established instead of a pressure of 21.0 g/cm$^2$ (AUL0.3 psi).

The water-absorbing polymer particles are tested by means of the test methods described below.

Methods:

The analyses should, unless stated otherwise, be performed at an ambient temperature of 23±2° C. and a relative air humidity of 50±10%. The water-absorbing polymer particles are mixed thoroughly before the analysis.

Permeability (Saline Flow Conductivity)

The permeability of the swollen gel bed (SFC) under a pressure of 21.0 g/cm$^2$ is, as described in EP 0 640 330 A1. determined as the gel layer permeability of a swollen gel layer of water-absorbing polymer particles, except that the apparatus described in the aforementioned patent application on page 19 and in FIG. 8 has been modified to the effect that the glass frit (40) is not used, and the die (39) consists of the same polymer material as the cylinder (37) and now comprises 21 bores of equal size distributed homogeneously over the entire contact area. The procedure and evaluation of the measurement remain unchanged from EP 0 640 330 A1. The flow rate is recorded automatically.

The saline flow conductivity (SFC) is calculated as follows:

$$\text{SFC } [\text{cm}^3\text{s/g}] = (Fg_{(t=0)} \times L_0)/(d \times A \times WP),$$

where $Fg_{(t=0)}$ is the flow of NaCl solution in g/s, which is obtained by means of a linear regression analysis of the $Fg_{(t)}$ data of the flow determinations by extrapolation to t=0, $L_0$ is the thickness of the gel layer in cm, d is the density of the NaCl solution in g/cm$^3$. A is the area of the gel layer in cm$^2$ and WP is the hydrostatic pressure over the gel layer in dyn/cm$^2$.

Moisture Content

The moisture content of the water-absorbing polymer particles is determined by the EDANA (European Disposables and Nonwovens Association) recommended test method No. WSP 230.2-05 "Moisture content".

Centrifuge Retention Capacity

The centrifuge retention capacity (CRC) is determined by the EDANA (European Disposables and Nonwovens Association) recommended test method No. WSP 241.2-05 "Centrifuge Retention Capacity".

Absorption Under a Pressure of 49.2 g/cm$^2$

The absorption under a pressure of 49.2 g/cm$^2$ (AUL0.7 psi) is determined analogously to the EDANA (European Disposables and Nonwovens Association) recommended test method No. WSP 242.2-05 "Absorption under Pressure", except that a pressure of 49.2 g/cm$^2$ (AUL0.7 psi) is established instead of a pressure of 21.0 g/cm$^2$ (AUL0.3 psi).

Extractables

The extractables are determined by the EDANA (European Disposables and Nonwovens Association) recommended test method No. WSP 270.2-05 "Extractables".

The EDANA test methods are obtainable, for example, from the European Disposables and Nonwovens Association, Avenue Eugene Plasky 157, B-1030 Brussels, Belgium.

EXAMPLES

Example 1

A monomer solution comprising 31.6% by weight of sodium acrylate, 9.9% by weight of acrylic acid, 0.17% by weight of 2,2'-azobis[2-(2-imidazoline-2-yl)propane] dihydrochloride, 0.085% by weight of sodium peroxodisulfate, 0.058% by weight of 3-tuply ethoxylated glyceryl triacrylate (approx. 85% by weight) and water was dropletized in a heated dropletization tower (height 12 m, width 2 m, gas velocity 0.1 m/s in cocurrent). At 20° C., the monomer solution had a dynamic viscosity of 0.0065 Pa·s, a density of 1.1 g/cm$^3$ and a surface tension of 0.039 N/m. The dropletizer plate had 30×170 µm bores. The metering rate of the mixture was 16.0 kg/h. The heating power of the gas preheater was regulated such that the gas outlet temperature in the dropletization tower was a constant 130° C.

The resulting water-absorbing polymer particles had a centrifuge retention capacity (CRC) of 30.5 g/g, an absorption under a pressure of 49.2 g/cm$^2$ (AUL0.7 psi) of 20.7 g/g, a permeability (SFC) of 11×10$^{-7}$ cm$^3$s/g, a moisture content of 12.6% by weight and an extractables content of 2.2% by weight.

Example 2

The procedure was as in example 1. The concentration of 3-tuply ethoxylated glyceryl triacrylate in the monomer solution was lowered to 0.018% by weight.

The resulting water-absorbing polymer particles had a centrifuge retention capacity (CRC) of 53.4 g/g, an absorption under a pressure of 49.2 g/cm$^2$ (AUL0.7 psi) of 7.7 g/g, a permeability (SFC) of 0×10$^{-7}$ cm$^3$s/g, a moisture content of 15.6% by weight and an extractables content of 6.7% by weight.

Example 3

A fluidized bed reactor with an internal diameter of 7 cm was initially charged with approx. 100 g of water-absorbing polymer particles from example 1. The superficial velocity of the carrier gas in the reactor was 1 m/s. The carrier gas used was technical-grade nitrogen with a temperature of 160° C. The water-absorbing polymer particles were dried in the reactor for 10 minutes. Subsequently, the carrier gas upstream of the reactor at 160° C. was loaded with 1,2-propanediol (t=0). The partial pressure of 1,2-propanediol in the carrier gas was approx. 20 mbar.

The resulting water-absorbing polymer particles were analyzed:

| Time [Minutes] | CRC [g/g] | AUL 0.7 psi [g/g] | Extractables [% by wt.] | SFC [×10$^{-7}$ cm$^3$s/g] |
|---|---|---|---|---|
| 0 | 30.1 | 19.7 | 3.1 | 9 |
| 15 | 31.5 | 23.7 | 3.1 | 16 |
| 30 | 29.4 | 23.3 | 2.4 | 38 |
| 45 | 27.3 | 21.9 | 3.1 | 50 |

Example 4

The procedure was as under example 3. The carrier gas temperature was raised to 180° C. and the surface postcrosslinker used was 2,3-butanediol.

The resulting water-absorbing polymer particles were analyzed:

| Time [Minutes] | CRC [g/g] | AUL 0.7 psi [g/g] | Extractables [% by wt.] | SFC [×10$^{-7}$ cm$^3$s/g] |
|---|---|---|---|---|
| 0 | 30.1 | 19.7 | 3.1 | 9 |
| 15 | 29.8 | 21.8 | 3.3 | 20 |
| 30 | 28.7 | 22.7 | 2.9 | 38 |
| 45 | 28.3 | 21.6 | 2.5 | 48 |
| 60 | 26.9 | 21.5 | 2.6 | 55 |

Example 5

The procedure was as under example 3. Water-absorbing polymer particles from example 2 were used.

The resulting water-absorbing polymer particles were analyzed:

| Time [Minutes] | CRC [g/g] | AUL 0.7 psi [g/g] | SFC [×10$^{-7}$ cm$^3$s/g] |
|---|---|---|---|
| 0 | 53.9 | 8.4 | 0 |
| 15 | 55.2 | 13.2 | 0 |
| 30 | 44.4 | 25.6 | 1 |
| 45 | 39.1 | 26.1 | 5 |

Example 6

The procedure was as under example 5. The carrier gas temperature was raised to 180° C.

The resulting water-absorbing polymer particles were analyzed:

| Time [Minutes] | CRC [g/g] | AUL 0.7 psi [g/g] | SFC [×10$^{-7}$ cm$^3$s/g] |
|---|---|---|---|
| 0 | 53.9 | 8.4 | 0 |
| 15 | 32.3 | 23.6 | 8 |
| 30 | 27.2 | 21.5 | 23 |

The invention claimed is:

1. A process for thermally surface postcrosslinking water-absorbing polymer particles in a fluidized bed generated by means of a carrier gas, which comprises supplying at least one surface postcrosslinker to the fluidized bed, wherein the at least one surface postcrosslinker is in a gaseous form, wherein a partial pressure of the surface postcrosslinker in the carrier gas of the fluidized bed is at least 5 mbar, and wherein the surface postcrosslinking is performed at a reaction temperature of at least 150° C.

2. The process according to claim 1, wherein a residence time of the water-absorbing polymer particles in the fluidized bed is at least 10 minutes.

3. The process according to claim 1, wherein the surface postcrosslinker comprises a diol.

4. The process according to claim 1, wherein the surface postcrosslinker comprises 1,2 propanediol and/or 2,3 butanediol.

5. The process according to claim 1, wherein at least 80% by volume of the carrier gas of the fluidized bed is nitrogen.

6. The process according to claim 1, wherein the water-absorbing polymer particles are obtained by polymerizing a monomer solution comprising
    a) at least one ethylenically unsaturated monomer which bears an acid group and may be at least partially neutralized,
    b) at least one crosslinker,
    c) at least one initiator, and
    d) optionally one or more ethylenically unsaturated monomer copolymerizable with the monomer mentioned under a), and
    e) optionally one or more water-soluble polymer.

7. The process according to claim 1, wherein the monomer a) is partially neutralized acrylic acid.

8. The process according to claim 1, wherein the water-absorbing polymer particles have a centrifuge retention capacity of at least 15 g/g.

* * * * *